3,330,312
LIQUID LEVEL CONTROL RESERVOIR
Tibor Parady, Cleveland, Ohio, assignor to Parady and Karol, Cleveland, Ohio, a business association of Ohio
Filed Jan. 21, 1964, Ser. No. 339,244
2 Claims. (Cl. 141—285)

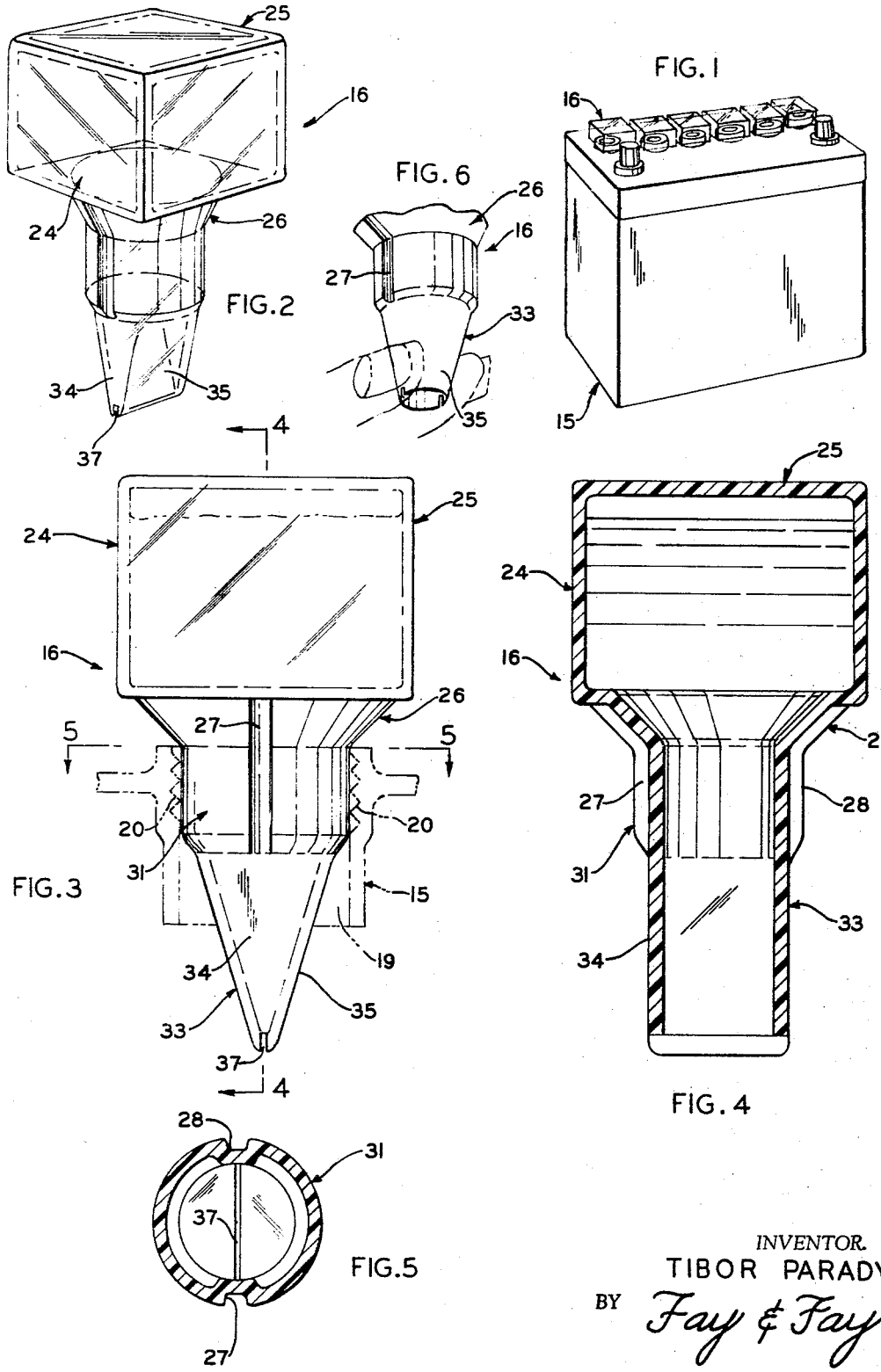

This invention relates to galvanic type storage batteries, and more particularly to a detachable reservoir unit mountable into individual cells thereof for maintaining a constant level of liquid in the cell apertures.

Heretofore it has been necessary for an auto owner to remove all of the cell plugs of a battery and peer into the cell chamber to ascertain the level of the liquid therein. In many instances the removal of these plugs has been found to be unnecessarily burdensome since the water level is sufficient and this leads to discouraging frequent checking. Furthermore, in the instances where the liquid level is found to be low, it is not immediately ascertainable by a visual check, but requires the time consuming task of removing the plugs. Accordingly, the task of checking the battery cells to see if the liquid level is at its proper level is not done with any amount of regularity and serious damage may result to the battery. It is to overcome these disadvantages that this invention is directed.

It is an object of this invention to provide a reservoir which is mountable in each cell of a battery and accordingly maintains the liquid level therein at its proper level and eliminates any damage thereto.

It is another object of this invention to provide a liquid level control reservoir which is easily attachable to individual cell apertures of the battery.

It is a further object of this invention to provide a liquid level reservoir whose own level may be ascertained without any necessary removing or unthreading thereof.

It is still a further object of this invention to provide a liquid level reservoir which is easily fillable and attachable with the minimum amount of loss of liquid therein.

It is still another object of this invention to provide a one-piece integrally formed liquid level reservoir whose liquid dispensing aperture is of a first normal size in a mounted position, and capable of assuming a second, more open, position for refilling conditions.

It is still a further object of this invention to provide a liquid level reservoir which automatically maintains the liquid level of the storage battery at a desired position, and also indicates to the user the quantity of reservoir liquid remaining in the reservoir without requiring removal of any cover or reservoir structure.

In accordance with one illustrative embodiment of the invention, and here first briefly described, the invention comprises a unitary liquid level control device including a closed rectangular or square shaped reservoir in which a liquid is contained, a frusto-conically shaped funneling member having one of its perimeters formed integral with the under surface of said reservoir and having its other perimeter formed integral with an annularly shaped mounting section, formed along the outer surfaces of said frusto-conical and annularly shaped mounting sections are channel shaped venting means, and formed integral to said mounting means and depending therefrom is a generally wedge shaped spout, said spout terminating in a narrow transverse opening to provide a metered flow of liquid from said reservoir to the aperture in which it is mounted, said spout being capable upon lateral forces being applied thereto of assuming an open, reservoir filling position.

The above and adidtional objects of this invention, together with the features will be more fully appreciated from the following detailed description when read with reference to the accompanying drawings, in which:

FIG. 1 is a perspective view of a battery having individual liquid level control reservoirs mounted in the cell wells thereof;

FIG. 2 is a perspective view of a liquid level control reservoir and bringing out the channel shaped venting feature and the transverse slitted aperture thereof;

FIG. 3 is an elevation view of the liquid level control reservoir mounted in one of the cell wells of a battery, the battery being shown in broken away phantom lines;

FIG. 4 is a side elevational view of the liquid level control reservoir and brings out in better detail the side channel venting means;

FIG. 5 is a view of the narrow slitted metering portion of the reservoir taken along the sectional line 5—5 of FIG. 3, and shows in greater detail the peripherally located venting means; and FIG. 6 shows the slit aperture as it takes on an almost circular form upon being laterally squeezed by finger pressure for filling purposes.

The invention here is shown to be used with a storage battery 15, however, it should be understood that it could be used with any type of liquid container. The storage battery 15 as shown in FIG. 1 comes manufactured with a number of cell plugs, one being provided for each cell. Also, each cell of the battery is separately constructed and is provided with individual cell liquid chambers. Accordingly, the storage battery will be provided with as many liquid level control reservoirs as are cell apertures. The normal 12 volt battery is provided with six cells, and therefore, FIG. 1 shows six liquid level control reservoirs being detachably mounted in the cell apertures of battery 15.

The material from which my liquid level control reservoir, 16, is constructed may be of any well known commercially available resilient, transparent material. It should, additionally, be made of acid resistance material, and capable of wide temperature variations. The purpose of having a transparent reservoir is to provide a quick visual checking device whereby the amount of liquid remaining in a reservoir may be easily ascertained without dismounting, or detaching the device from the cell aperture. Accordingly, with my transparent control reservoir, by mere glance, the auto owner will be able to see when the reservoir is empty or is approaching an empty stage and a refilling thereof is required. In this manner, a liquid containing reservoir is provided and accordingly the cell will not be permitted to reach a dangerously low or empty liquid level with a resulting damage thereto. Furthermore, a resilient or flexible material should be chosen to provide for a necessary enlarging of the transverse slit opening 37 for filling purposes, this is brought out in FIG. 6 and will be explained in more detail hereinafter. Also, because of the fact that the annular shaped supporting section 31 is not threaded it is important that this section be of a diameter slightly larger than the aperture to which it is mounted in order to provide a proper forced fitting therewith. It is accordingly seen that a suitably resilient material is necessary.

My liquid level control reservoir should preferably be made of a one-piece construction and accordingly any well known commercially available means for forming the same may be utilized and are intended to be within the scope of this invention. For example, the device may be formed by any well known blow molding technique. In the alternative, it may be formed of individual parts which are joined together in a water tight sealing procedure.

The liquid storing portion of my device is a closed rectangular or square shaped body member 25. The shape of body member 25 was carefully chosen in order to provide the maximum amount of liquid capacity and to conveniently take advantage of all of the available volumetric space above the cell apertures. This is better seen when reference is made to FIG. 1 wherein the individual liquid level control devices are shown in a mounted position. It can obviously be seen that if the body members 25 were of circular shape that the size thereof would be limited by the individual diameters of the body members. More specifically, it is obvious that the maximum diameter of the body would be such that the individual reservoirs were in abutting, but individually manipulatable, juxtaposed position. However, with a circular reservoir body there would be a certain amount of available volumetric space which would not be used to the maximum. However, if a square or rectangular body member is used it can be seen that the maximum available volumetric space is utilized.

Integrally formed to the under surface 24 of reservoir 25 is a funnel shaped, downwardly converging, frusto-conically shaped body portion 26. Connected to the other perimeter of the frusto-conically shaped body member 26 is an annular shaped mounting section 31. The annular shaped mounting section 31 is integrally formed to the smaller diametrical opening of the frusto-conically shaped body member 26. Depending from and integrally formed to the other end of the annular shaped mounting section 31 is a wedge shaped spout 33 having sides 34 and 35. The wedge shaped spout 33 terminates in a transversely extending slit 37. Slit 37 is shown in FIG. 5 to be of a narrow cross-sectional area to provide a precalculated rate of liquid transfer from the reservoir to the cell into which it is mounted.

In order to provide a proper venting of the inside cell chamber venting means 27 and 28 are provided along the outer peripheral surface of the annular shaped mounting section 31 and the frusto-conically shaped body portion 26. It should here be understood that only a single venting groove could have been provided, or considerably more could have been provided, and any desired number of venting grooves are within the scope of this invention.

The normal level of the liquid within the cell chamber is such as to normally seal the transverse slit 37 and thereby prevent a venting, displacement of the liquid by air of the device, and accordingly prohibit any transfer of liquid from the reservoir to the cell. However, upon a decrease in the level of the liquid within the cell chamber, and upon a proper venting of the device and the cell chamber, a transfer of liquid will occur from the reservoir to the cell to insure that a proper cell chamber liquid level is constantly maintained. In the above manner, the cells of battery 15 will be automatically maintained in a normal level condition.

If, after the passage of time, the liquid level in the control reservoir is decreased to a dangerously low level, and which level is conveniently ascertainable by a quick visual check, and a refilling thereof is desired, then, since the device 16 is made of a suitably resilient and compressible material, all that is required is to apply a lateral force upon the triangular shaped sides 34 of the wedge shaped spout such as by finger pressure and thereby obtain a suitable increased size in the aperture of slit 37. As shown in FIG. 6, upon a lateral force being applied by a finger pressure, the slit takes on an almost circular configuration. In this manner, it is seen that slit 37 is, in a normally attached cell mounted position, of a pre-calculated cross-sectional area to permit a predetermined rate of liquid transfer from the reservoir to the cell under actual operating conditions. Furthermore, it should here be emphasized that the liquid transfer from the reservoir to the cell will be accomplished without the aid of a reservoir 25 vent because slit 37 is of precalculated cross-sectional area such that vibrations experienced by the automobile, and transferred to the battery, will be sufficient to permit a liquid flow upon the liquid level in the cell dropping to a level that exposes the slit. The narrow, cross-sectional area of slit 37 is also important because it permits only a negligible amount of liquid to escape therethrough between the refilling thereof and its remounting into a cell chamber.

*Theory of operation*

Initially an auto owner must remove the threaded plugs which are normally found covering the cell apertures of a storage battery. The liquid level control reservoir would then have to be filled by applying finger pressure to the wedge shaped spout 33 to deform slit 37 into a substantially circular shaped opening. The reservoir would then be filled from an ordinary spigot or hose and the finger pressure would then be removed. Upon the removal of the finger pressure spout 33 assumes its normal configuration with a narrow slit opening as shown in FIGS. 2, 3 and 5. The reservoir is then force fitted into a cell aperture of battery 15. Because of the small transverse opening 37 a negligible amount of liquid would be dispensed from the reservoir in this mounting operation.

Also, due to the fact that the reservoir is made of a compressible, resilient material and the annular shaped mounting section 31 is made with an outer diameter slightly greater than the opening of the cell apertures, body 31 will be forced fitted thereinto to provide a proper frictional holding action therebetween. In the above manner it can be seen that no external threads along the periphery of the annular shaped mounting member 31 are necessary. The invention is now in operating condition and all that is necessary is for the auto owner to take normal visual inspection thereof at convenient intervals to see see that the reservoir has a proper amount of liquid stored therein. In the above manner as the cell liquid is dissipated by evaporation or other chemical processes the venting action due to the channel shaped venting means formed integrally along the periphery of the mounting member will enable a communication or dispensing of the liquid within the reservoir to the cell and thereby maintain the normal proper liquid level therein.

While it will be apparent that the embodiment of this invention herein disclosed is well calculated to fulfill the objects of the invention, it will be appreciated that the invention is susceptible to modification, variation and change without departing from the proper scope or fair meaning of the subjoined claims.

I claim:

1. A liquid level control device mountable within a chamber of a liquid containing container comprising, a closed rectangular shaped reservoir in which a liquid is contained, a frustoconically shaped funneling member having its larger diameter perimeter integrally connected with the under surface of said reservoir, an annularly shaped mounting section integrally formed to the other perimeter of said frusto-conically shaped funneling member, venting means formed along the outer surfaces of said annularly shaped mounting section, and a generally wedge shaped spout formed integrally to and depending from said annularly shaped mounting section, said spout terminating in a narrow transverse permanently open opening to provide a metered flow of liquid from said reservoir to the chamber in which it is mounted, said spout having triangular shaped side walls which terminate in said narrow transverse openings and capable of assuming an open reservoir filling position upon lateral forces being applied thereto.

2. An automatic liquid level maintained reservoir, mountable into an opening of a liquid containing container having a fluctuating liquid level unitarily constructed from a transparent resilient material comprising, a plural sided closed reservoir storing a liquid, a mounting section integrally formed to one of said sides of said reservoir, said mounting section being made of resilient material for forced fitting into the opening of said container, and a generally wedge shaped spout having generally triangularly shaped side walls and substantially elongated frontal and rear surfaces, said spout terminating in a narrow slitted permanently open opening to provide a limited flow of liquid from said reservoir to said container, said mounting section having venting channels formed integrally along the outer surface thereof, said narrow slitted opening capable of assuming an open reservoir filling position upon forces being laterally applied to said triangular shaped side walls.

References Cited

UNITED STATES PATENTS

| 820,987 | 5/1906 | Perotti | 222—490 X |
|---|---|---|---|
| 2,369,496 | 2/1945 | Sengbusch | 120—59 |
| 2,543,724 | 2/1951 | Iwanowski | 141—285 X |
| 2,922,178 | 1/1960 | Kelly | 222—490 X |

FOREIGN PATENTS

| 1,069,529 | 2/1954 | France. |
|---|---|---|

LAVERNE D. GEIGER, *Primary Examiner.*

E. J. EARLS, *Assistant Examiner.*